United States Patent
Mamish et al.

(10) Patent No.: US 10,746,342 B2
(45) Date of Patent: Aug. 18, 2020

(54) CLOSURE PATCH

(71) Applicant: Seal For Life Industries US LLC, New York, NY (US)

(72) Inventors: Abboud L. Mamish, Marlborough, MA (US); David K. Gage, Mansfield, MA (US)

(73) Assignee: Seal For Life Industries US LLC, New York, NY (US)

( * ) Notice: Subject to any disclaimer, the term of this patent is extended or adjusted under 35 U.S.C. 154(b) by 399 days.

(21) Appl. No.: 15/610,317

(22) Filed: May 31, 2017

(65) Prior Publication Data

US 2017/0343149 A1 Nov. 30, 2017

Related U.S. Application Data

(60) Provisional application No. 62/343,368, filed on May 31, 2016.

(51) Int. Cl.
*F16L 58/10* (2006.01)
*F16L 58/18* (2006.01)
*C09J 133/04* (2006.01)

(52) U.S. Cl.
CPC ......... *F16L 58/181* (2013.01); *F16L 58/1063* (2013.01); *C09J 133/04* (2013.01); *C09J 2201/606* (2013.01); *C09J 2203/30* (2013.01); *C09J 2433/00* (2013.01)

(58) Field of Classification Search
CPC ....... F16L 13/004; F16L 55/168; F16L 55/17; F16L 55/175; F16L 58/181; B29C 65/564

USPC ......... 285/285.1, 294.1, 294.2, 381.1, 381.4, 285/381.5, 55
See application file for complete search history.

(56) References Cited

U.S. PATENT DOCUMENTS

| | | | | |
|---|---|---|---|---|
| 2,828,800 A | * | 4/1958 | Hopkins | F16L 58/181 156/215 |
| 3,415,287 A | * | 12/1968 | Lanza | F16L 59/021 138/141 |
| 3,539,411 A | * | 11/1970 | Lanza | F16L 47/22 156/86 |
| 3,554,999 A | * | 1/1971 | Shaw et al. | B29C 61/0616 264/514 |
| 3,561,795 A | * | 2/1971 | Becher | F16L 47/02 285/55 |
| 4,549,752 A | * | 10/1985 | Nimke | F16L 13/103 285/373 |
| 4,660,861 A | * | 4/1987 | Argy | F16L 59/029 285/45 |
| 4,961,978 A | | 10/1990 | Doheny, Jr. | |
| 5,022,941 A | | 6/1991 | Doheny, Jr. | |
| 2003/0116214 A1 | * | 6/2003 | Meli | F16L 13/0272 138/123 |
| 2007/0063509 A1 | * | 3/2007 | Gronquist | F16L 13/0272 285/294.2 |
| 2007/0063510 A1 | * | 3/2007 | Gronquist | F16L 55/17 285/294.2 |
| 2007/0241558 A1 | * | 10/2007 | Nestegard | B23K 31/12 285/294.2 |

(Continued)

*Primary Examiner* — Aaron M Dunwoody
(74) *Attorney, Agent, or Firm* — Jones Day (57) ABSTRACT

A heat-shrink sleeve is provided for covering a pipe joint formed between two pipes that are coupled to one another to form a tube. The heat-shrink sleeve includes a heat-shrinkable material that is configured to conform to the first and second pipes when heated to cover the pipe joint.

18 Claims, 5 Drawing Sheets

(56) References Cited

U.S. PATENT DOCUMENTS

| | | | |
|---|---|---|---|
| 2008/0113094 A1* | 5/2008 | Casper | C09J 133/066 427/208.4 |
| 2010/0065614 A1* | 3/2010 | Cittadini Bellini | B23K 37/0533 228/176 |
| 2011/0070389 A1* | 3/2011 | Aulicino | B29C 61/0616 428/40.1 |
| 2012/0077027 A1* | 3/2012 | Navarro | B32B 7/12 428/343 |
| 2012/0090765 A1* | 4/2012 | Tailor | B29C 61/00 156/86 |
| 2013/0168958 A1* | 7/2013 | Van Den Bergh | B29C 61/0616 285/294.1 |
| 2014/0034216 A1* | 2/2014 | Cittadini Bellini | B29C 63/42 156/86 |
| 2015/0041017 A1* | 2/2015 | Hegdal | F16L 58/181 138/145 |
| 2015/0219264 A1* | 8/2015 | Tailor | F16L 47/22 156/86 |
| 2016/0039184 A1* | 2/2016 | Tailor | B32B 27/32 428/355 N |
| 2017/0023159 A1* | 1/2017 | Lewandowski | F16L 53/37 |
| 2017/0343149 A1* | 11/2017 | Mamish | F16L 58/181 |
| 2019/0040991 A1* | 2/2019 | Navarro | F16L 58/181 |

\* cited by examiner

CLOSURE PATCH

CROSS REFERENCE TO RELATED APPLICATIONS

This application claims the benefit of priority under 35 U.S.C. § 119(e) to U.S. Provisional Patent Application No. 62/343,368, filed May 31, 2017. The disclosure set forth in the referenced application is incorporated herein by reference in its entirety.

BACKGROUND

The present disclosure relates to a covering for a tube, and particularly to a tube covering. More particularly, the present disclosure relates to a heat-shrinkable tube covering.

SUMMARY

A conduit in accordance with the present disclosure includes a wraparound sheet and a tube extending through a tube-receiving passageway formed in the wraparound sheet. The tube includes a first pipe and a second pipe coupled together at a pipe joint. The wraparound sheet cooperates with exterior pipe coatings on the first and second pipes to provide a continuous corrosion protection system for the conduit.

In illustrative embodiments, the wraparound sheet extends circumferentially around the portion of the tube having the pipe joint and includes a first edge and a second edge. When wrapped around the tube, the first edge of the wraparound sheet is located between the second edge of the wraparound sheet and the tube and forms a sheet seam extending in co-axial parallel relation with the tube-receiving passageway.

In illustrative embodiments, a closure strip is coupled to the wraparound sheet to cover the sheet seam. The closure strip and the wraparound sheet cooperate to form a heat-shrink sleeve on the tube to cover the pipe joint. The closure strip includes a pressure-sensitive adhesive layer configured to couple the closure strip to the wraparound sheet without pre-heating the closure strip so that movement of the first edge of the wraparound sheet relative to the second edge of the wraparound sheet during heat shrinking of the heat-shrink sleeve is minimized.

In illustrative embodiments, the pressure-sensitive adhesive layer includes at least one pressure-sensitive adhesive. The at least one pressure-sensitive adhesive allows the closure strip to mate with the wraparound sheet without heat by using only pressure applied to the closure strip.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIGS. 1-4 are a series of views showing formation of a pipe joint between two pipes included in a tube and application of a heat-shrink sleeve to the pipes to cover and protect the pipe joint;

FIG. 10 is a diagrammatic view a process for forming and coupling the heat-shrink sleeve to the tube showing that the process includes the steps of providing a tube, providing a wraparound sheet, wrapping the wraparound sheet around the pipe joint of the tube, heating a heat-activated adhesive layer of the wraparound sheet to couple the first edge of the wraparound sheet to the second edge of the wraparound sheet to form the sheet seam, providing the closure patch, removing the release liner to form the closure strip, arranging the closure strip on the sheet seam, applying pressure to the closure strip to mate the closure strip to the sheet seam without heat to form the heat-shrink sleeve, and heating the heat-shrink sleeve to cause the heat-shrink sleeve to recover to the shape of the tube and forming the conduit.

DETAILED DESCRIPTION

A heat-shrink sleeve 17 has an exterior, heat-activated, heat-shrink layer surrounding an interior adhesive layer as shown illustratively in FIGS. 2-4 and 8-9. Heat-shrink sleeve 17 includes a wraparound sheet 14 and a closure strip 16 in an illustrative embodiment as suggested in FIGS. 3 and 4. Closure strip 16 includes a backing layer 36 and a pressure-sensitive adhesive layer 34 arranged to interconnect backing layer 36 and wraparound sheet 14 in response to application of pressure. Closure strip 16 secures wraparound sheet 14 during a heat-shrinking process. Wraparound sheet 14 and closure strip 16 cooperate to form heat-shrink sleeve 17 on a tube 12 to cover a pipe joint 22 in tube 12. Once heat-shrink sleeve 17 is exposed to external heat 80, heat-shrink sleeve 17 shrinks and forms a conduit 10 as suggested in FIGS. 4 and 9.

Figure 3:
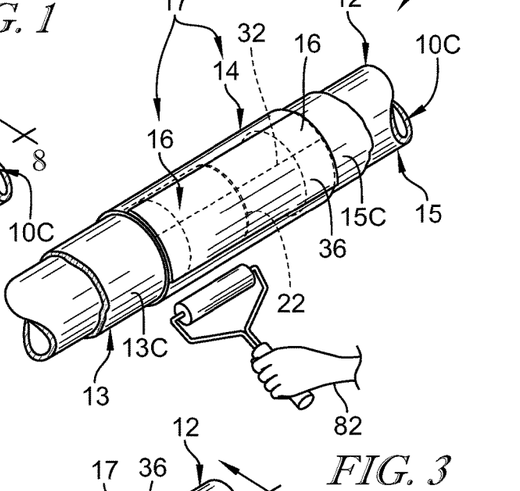
FIG. 3 is a view similar to FIG. 2 showing the closure strip coupled to the sheet seam of the wraparound sheet after pressure has been applied and without heat to cause the heat-shrink sleeve that extends circumferentially around the tube from the first-exterior pipe coating to the second-exterior pipe coating to be established.
Figure 4:
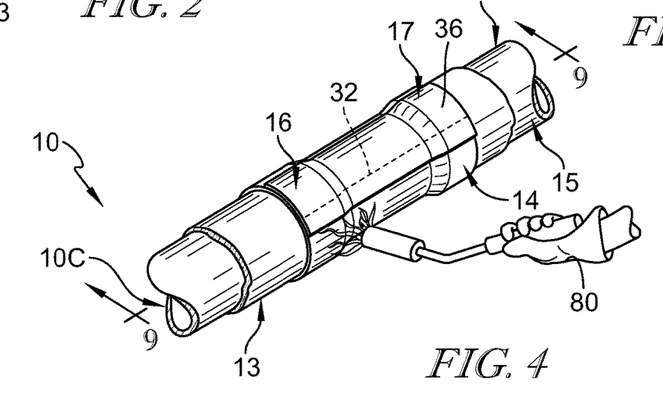
FIG. 4 is a view similar to FIG. 3 showing heat from a torch has been applied to the heat-shrink sleeve to cause the heat-shrink sleeve to shrink around the pipe joint interconnecting the pipes to form a continuous corrosion barrier for the conduit.

Conduit 10 in accordance with the present disclosure includes tube 12, wraparound sheet 14, and closure strip 16, as shown in FIGS. 3 and 4. Tube 12 is configured to transport fluid in an interior space located therein. Wraparound sheet 14 is configured to extend around a portion of tube 12. Closure strip 16 secures wraparound sheet 14 during a heat-shrink process and locates wraparound sheet 14 between closure strip 16 and tube 12. Wraparound sheet 14 and closure strip 16 cooperate to form heat-shrink sleeve 17 which extends circumferentially around tube 12 to provide corrosion resistance to a portion of tube 12.

Figure 1:
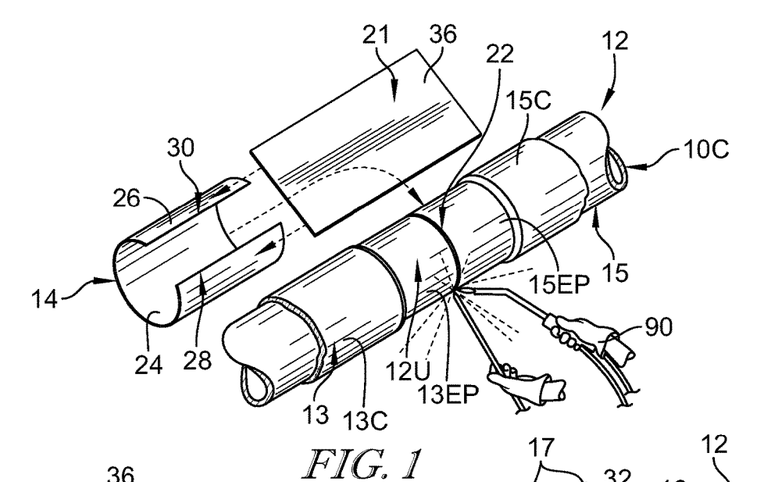
FIG. 1 is a perspective view showing an initial stage of forming the tube in which a first fluid-transport unit including a first pipe and a first exterior pipe coating on a portion of the first pipe is aligned with a second fluid-transport unit including a second pipe and a second exterior pipe coating on a portion of the second pipe and showing the first pipe being welded to the second pipe to form a pipe joint and suggesting that a wraparound sheet and a closure patch will be mated to provide a heat-shrink sleeve mounted on the tube to form a conduit as shown, for example, in FIG. 4.
Figure 5:
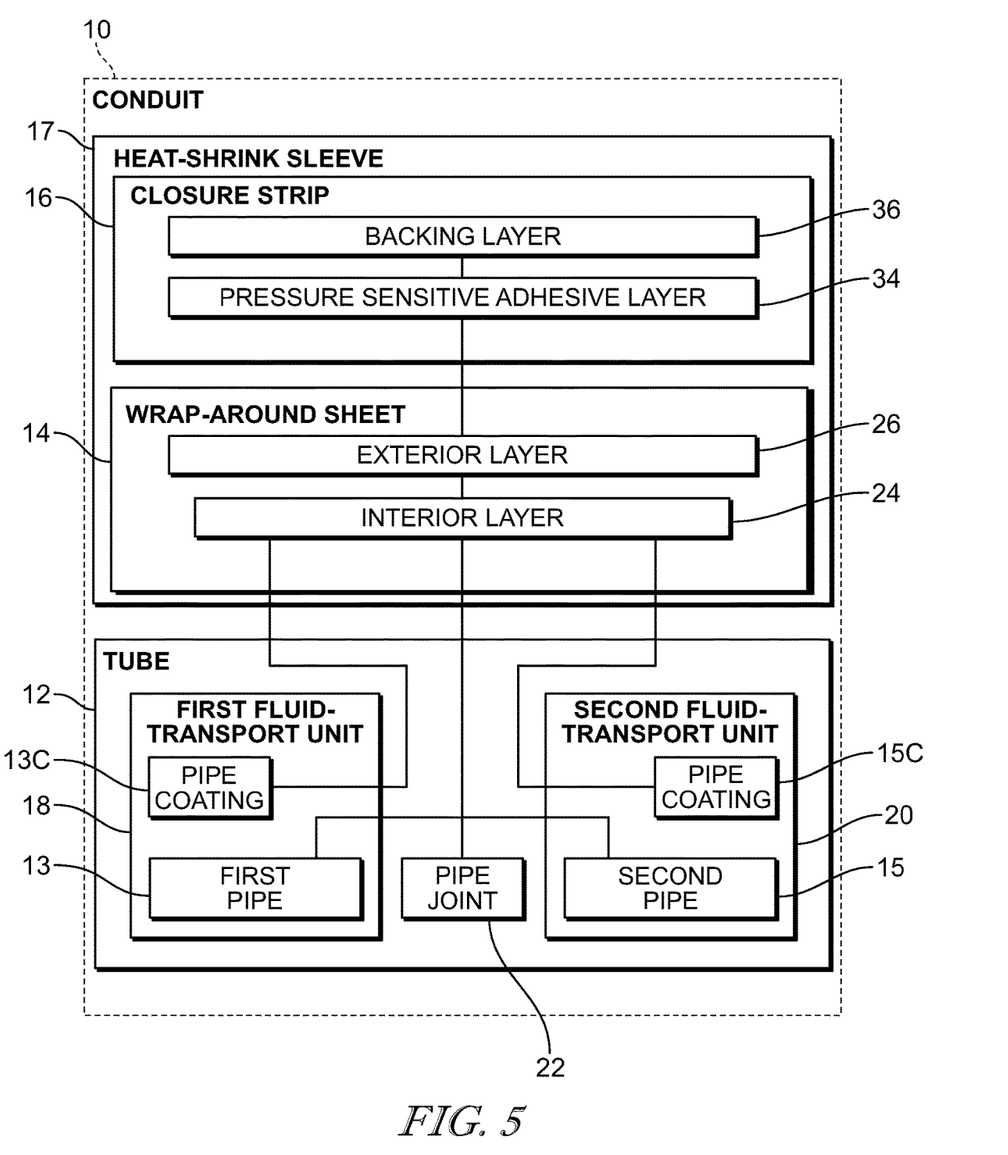
FIG. 5 is a diagrammatic view of a portion of the conduit in accordance with the present disclosure showing from top to bottom that the heat-shrink sleeve includes a closure strip including a backing layer and a pressure-sensitive adhesive layer coupled to the wraparound sheet, the wraparound sheet includes an exterior layer and an interior layer coupled to the tube, and the tube includes the first fluid-transport unit coupled to the second fluid-transport unit at the pipe joint.
Figure 8:
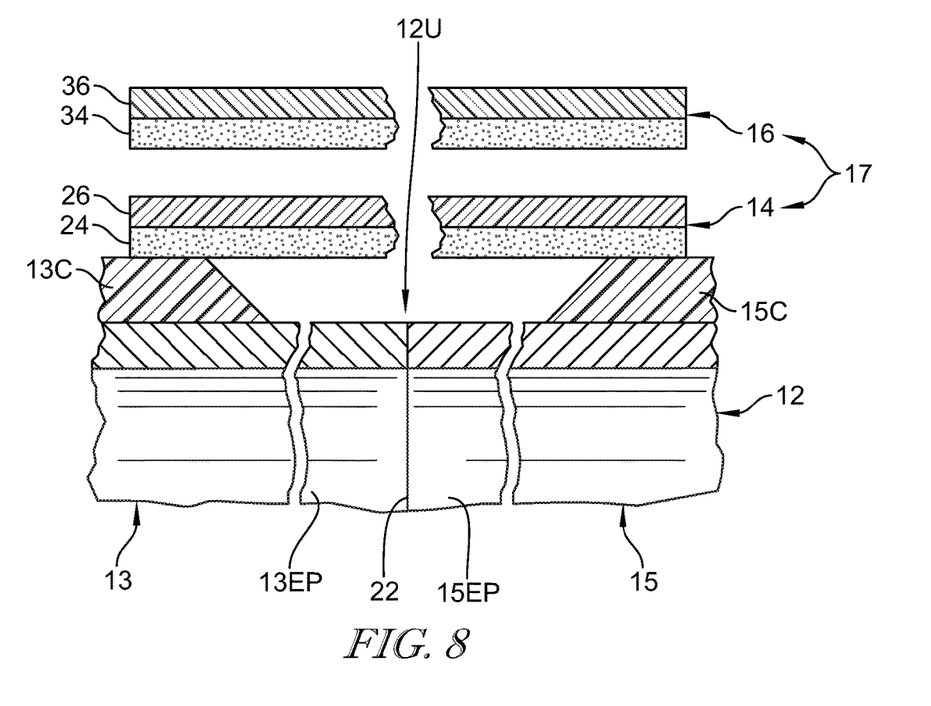
FIG. 8 is an enlarged sectional view taken along line 8-8 of FIG. 2, showing that the release liner has been removed from the closure patch to establish the closure strip ready for mating with the wraparound sheet and showing that the wraparound sheet is arranged to overlie the pipe joint and an uncoated portion of the tube located between the first exterior pipe coating and the second exterior pipe coating prior to heat shrinking of the wraparound sheet.

Tube 12 includes a first fluid-transportation unit 18 including a first pipe 13 having a first exterior pipe coating 13C, a second fluid-transportation unit 20 including a second pipe 15 having a second exterior pipe coating 15C, and a pipe joint 22 interconnecting first and second fluid-transportation units 18, 20 as suggested in FIGS. 1, 5, and 8. Tube 12 is formed to include a fluid-conducting channel 10C extending therethrough as suggested in FIGS. 1-3. Pipes 13, 15 cooperate to form a portion of tube 12 extending through a tube-receiving passageway defined by interior layer 24 of wraparound sheet 14 of as suggested in FIGS. 1, 5, and 8. Tube 12 is arranged to extend through wraparound sheet 14 and closure strip 16, as shown in FIGS. 1-4.

Figure 2:
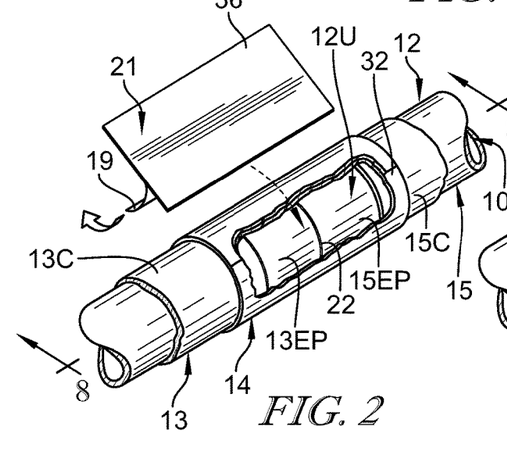
FIG. 2 is a view similar to FIG. 1 showing the wraparound sheet having a heat-activated, heat-shrink layer extending circumferentially around the tube and forming a sheet seam and suggesting that a closure strip is applied to the sheet seam after removal of a release liner from the closure patch.

Wraparound sheet 14 has a tubular shape and covers pipe joint 22 formed at the abutting ends of first pipe 13 and second pipe 15 as suggested in FIGS. 1-3. Wraparound sheet 14 includes an interior layer 24 and an exterior layer 26. In an example, wraparound sheet 14 includes an interior heat-activated adhesive layer 24 and an exterior heat-activated heat shrink layer 26. Interior layer 24 comprises an adhesive configured to adhere to exterior pipe coatings 13C, 15C applied to first and second pipes 13, 15 included in tube 12 and to an exterior uncoated section 12U of tube 12 including pipe joint 22 as suggested in FIGS. 1, 2, and 9. In an example, interior layer 24 comprises a heat-activated adhesive. In another example, interior layer 24 comprises a pressure-sensitive adhesive.

Figure 7:
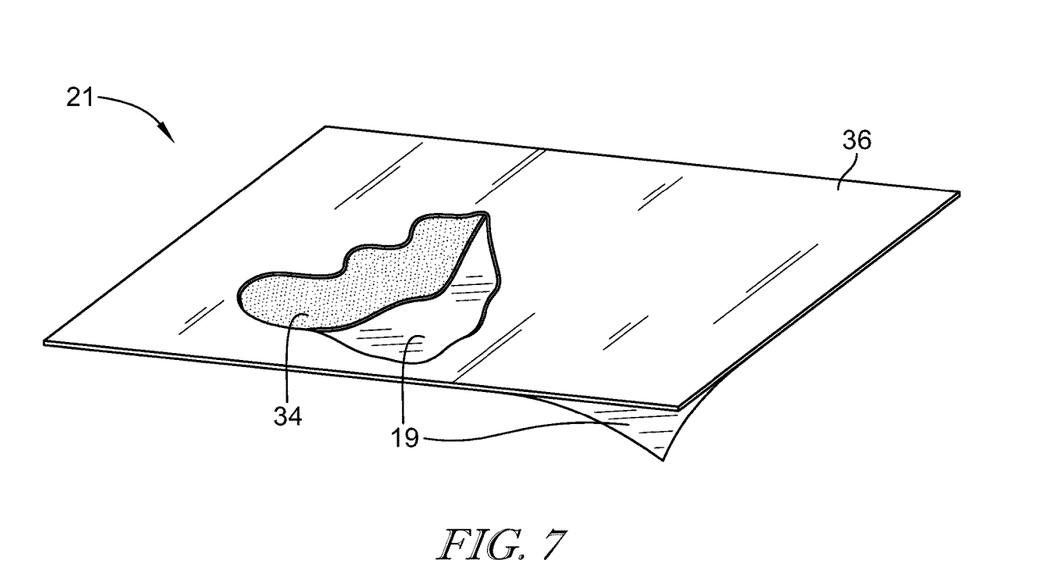
FIG. 7 is a perspective view of the closure patch with portions broken way to reveal that the closure patch includes, from top to bottom, the backing layer, the pressure sensitive adhesive layer, and the release liner, and suggesting that that the release liner may peeled away from the closure strip to expose the pressure sensitive adhesive layer.

Closure strip 16 is formed by removing release liner 19 from closure patch 21 as shown in FIGS. 2 and 7. Closure strip 16 includes pressure-sensitive adhesive layer 34 and backing layer 36 as shown in FIG. 5. Pressure-sensitive adhesive layer 34 is configured to couple to wraparound sheet 14 by applying pressure without heat to locate sheet seam 32 between tube 12 and backing layer 36. In another example, closure strip 16 is configured to couple to wraparound sheet 14 by applying pressure with heat to locate sheet seam 32 between tube 12 and backing layer 36.

First fluid-transport unit 18 includes a first pipe 13 and a first exterior pipe coating 13C coupled to an exterior surface of first pipe 13 as suggested in FIGS. 1 and 5. First pipe 13 is configured to retain fluid therein. In an illustrative embodiment, first pipe 13 is formed of a metal. In an illustrative embodiment, first exterior pipe coating 13C comprises a plastic material. In another embodiment, first exterior pipe coating 13C comprises a polyethylene material.

Second fluid-transport unit 20 includes a second pipe 15 and a second exterior pipe coating 15C coupled to an exterior surface of second pipe 15 as suggested in FIGS. 1 and 5. Second pipe 15 is configured to retain fluid therein. In an illustrative embodiment, second pipe 15 is formed of a metal. In another illustrative embodiment, first pipe 13 and second pipe 15 are formed of the same metal. In an illustrative embodiment, second exterior pipe coating 15C comprises a plastic material. In another embodiment, second exterior pipe coating 15C comprises a polyethylene material.

A first exposed portion 13EP of the first pipe 13 is mated to a second exposed portion 15EP of second pipe 15 to establish pipe joint 22 therebetween. Exposed portions 13EP, 15EP, and pipe joint 22 cooperate to define an exterior uncoated section 12U of tube 12 located between first and second exterior pipe coatings 13C, 15C as suggested in FIGS. 2, 9 and 10.

As shown in FIG. 1, pipe joint 22 is used to interconnect the ends of pipes 13, 15 by welding. Illustratively, first fluid-transport unit 18 may be connected to second fluid-transport unit 20 using a TIG welder 90, as shown in FIG. 1. It is within the scope of this disclosure to use any suitable welding or coupling technique. After joining first and second fluid-transport units 18, 20, wraparound sheet 14 and closure strip 16 can be arranged to form heat-shrink sleeve 17 over first fluid-transport unit 18 and second fluid-transport units 20 so as to cover pipe joint 22, first exposed portion 13EP, and second exposed portion 15EP, as suggested in FIGS. 3 and 4.

Wraparound sheet 14 and closure strip 16 cooperate to form heat-shrink sleeve 17. Heat-shrink sleeve 17 may have a tubular shape and covers uncoated section 12U formed at the abutting ends of a first pipe 13 and a second pipe 15 as suggested in FIGS. 2, 3, and 5. Pipes 13, 15 cooperate to form a portion of a tube 12 extending through a tube-receiving passageway defined by interior layer 24 of wraparound sheet 14 of heat-shrink sleeve 17 as suggested in FIG. 2. Interior layer 24 of wraparound sheet 14 includes an adhesive configured to adhere to exterior pipe coatings 13C, 15C and exterior uncoated section 12U of tube 12 including pipe joint 22 as suggested in FIGS. 2-4 and 9 to provide corrosion resistance.

As shown in FIG. 4, heat-shrink sleeve 17 is heated using gas torch 80 or other suitable heater to at least a predetermined temperature to cause exterior layer 26 to shrink and conform to exposed portions 13EP, 15EP of first and second fluid-transport units 18, 20. Using an illustrative technique suggested in FIG. 4, gas torch 80 is moved around the circumference of heat-shrink sleeve 17 using a side-to-side motion to apply heat to all exposed exterior surfaces of wraparound sheet 14 and closure strip 16 of heat-shrink sleeve 17.

Figure 9:
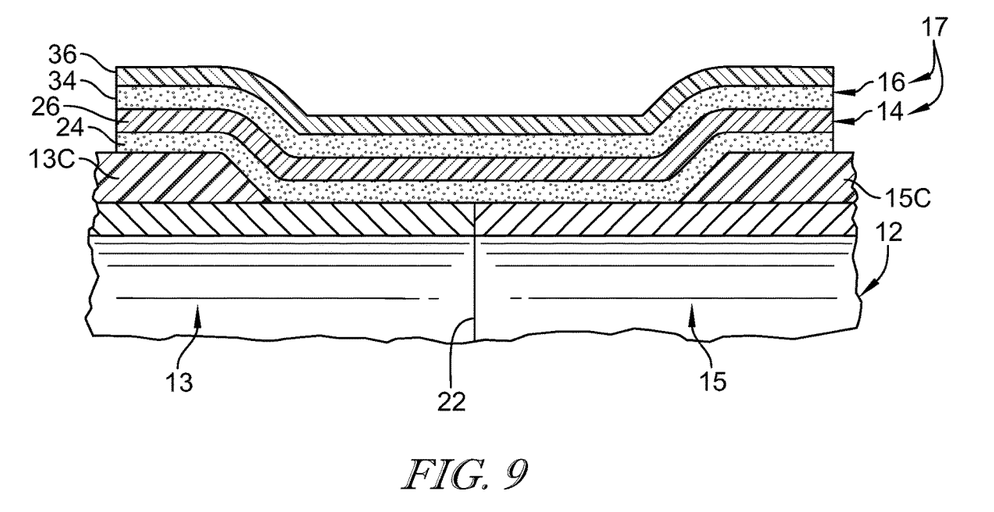
FIG. 9 is an enlarged sectional view taken along line 9-9 of FIG. 4 showing the heat-shrink sleeve including the closure strip and the wraparound sheet mated with the tube after heating with the torch and showing that the heat-shrink sleeve extends between the first and second exterior pipe coatings to cover the uncoated portion of the tube to form a continuous corrosion protection barrier.

Wraparound sheet 14 includes interior layer 24, exterior layer 26, a first edge 28, and second edge 30 spaced-apart from first edge 28. Interior layer 24 is formed of a heat-activated adhesive and can alternatively be called a heat-activated adhesive layer 24. Exterior layer 26 is formed of a heat-shrinkable material and can alternatively be called a heat-activated heat shrink layer 26. Wraparound sheet 14 wraps around tube 12 to form a sheet which locates exterior layer 26 of first edge 28 between interior layer 24 of second edge 30 and tube 12 as shown in FIG. 2. Exterior layer 26 of wraparound sheet 14 has heat-shrinking properties that allow wraparound sheet 14 to shrink and conform to the shape of the underlying structure as shown in FIGS. 4 and 9 when external heat 80 is applied as shown in FIG. 4.

In illustrative embodiments, exterior layer 26 is heat shrinkable when exposed to heat above a predetermined temperature. As an example, exterior layer 26 is made from a polyolefin-based sheet that shrinks by about 5% to about 200%, based on the reduction in length, upon heating. In another embodiment, the polyolefin layer shrinks by about 10% to about 60%, based on the reduction in length, upon heating. In yet another embodiment, the polyolefin layer shrinks by about 25% to about 50%, based on the reduction in length, upon heating. In one embodiment, the polyolefin layer shrinks from about 10% to about 60%, based on the % reduction in length, upon heating.

Closure strip 16 cooperates with wraparound sheet 14 to form heat-shrink sleeve 17 and includes backing layer 36 and pressure-sensitive adhesive layer 34 as shown in FIGS. 2 and 5-7.

Figure 6:
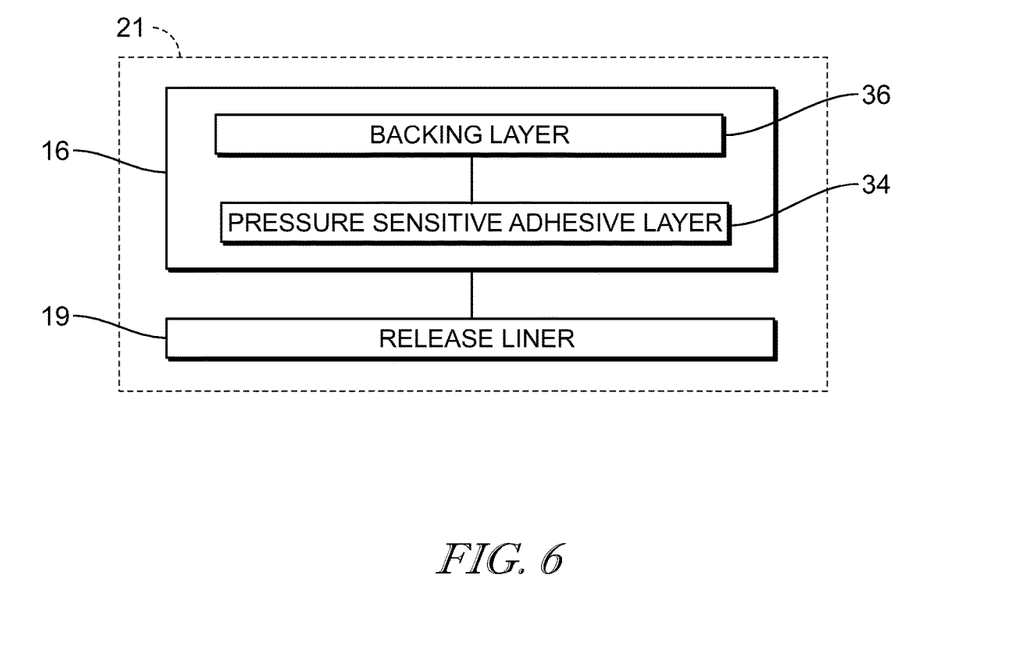
FIG. 6 is a diagrammatic view of the closure patch showing from top to bottom that the closure patch includes the closure strip including the backing layer and the pressure sensitive adhesive layer and a release liner mated with the pressure-sensitive adhesive layer to protect the pressure sensitive adhesive layer from getting damaged or dirty prior to installation.

Pressure-sensitive adhesive layer 34 extends between and interconnects backing layer 36 with exterior layer 26 of wraparound sheet 14, as shown in FIGS. 5, 6, and 8. Pressure-sensitive adhesive layer 34 is configured to couple closure strip 16 to wraparound sheet 14 without heating so that movement of first edge 28 of wraparound sheet 14 relative to second edge 30 of wraparound sheet 14 during heat shrinking of heat-shrink sleeve 17 is minimized. Pressure-sensitive adhesive layer 34 comprises a pressure-sensitive adhesive that couples closure strip 16 to wraparound sheet 14 without heat. In another example, pressure-sensitive adhesive layer 34 is configured to couple closure strip 16 to wraparound sheet 14 with heat. In yet another example, pressure-sensitive adhesive layer 34 is configured to couple closure strip 16 to wraparound sheet 14 with both heat and pressure.

In illustrative embodiments, pressure-sensitive adhesive layer 34 comprises a pressure-sensitive adhesive formulation including at least one pressure-sensitive adhesive. In some embodiments, the pressure-sensitive adhesive is an acrylic pressure-sensitive adhesive. In an embodiment, the at least one pressure-sensitive adhesive is Aroset s488 available from Ashland. In another embodiment, the at least one pressure-sensitive adhesive is Aroset 1551a available from Ashland. In another embodiment, the at least one pressure-sensitive adhesive is s8764 available from Avery-Dennison. In some embodiments, the pressure-sensitive adhesive is a urethane pressure-sensitive adhesive. In some embodiments, the pressure-sensitive adhesive may be a heat cross-linkable pressure sensitive adhesive. In some embodiments, the pressure-sensitive adhesive may be a UV-activated pressure-sensitive adhesive.

Illustratively, each pressure-sensitive adhesive formulation comprises a solvent blend. In an illustrative embodiment, a solvent blend comprises a mixture of an aromatic solvent, a non-aromatic solvent, and an alcohol. In an exemplary embodiment, a solvent blend comprises ethyl acetate, heptane, toluene, and isopropanol. In another exemplary embodiment, the solvent blend comprises about 60% ethyl acetate, about 20% heptane, about 17% toluene, and about 3% isopropanol. In another exemplary embodiment, a solvent blend comprises ethyl acetate, toluene, and isopropanol. In yet another exemplary embodiment, a solvent blend comprises about 52% ethyl acetate, about 41% toluene, and about 7% isopropanol. In still yet another exemplary embodiment, a solvent blend comprises about 35% ethyl acetate, about 53% toluene, and about 12% isopropanol.

In some embodiments, the pressure-sensitive adhesive formulation further comprises a cross-linker. In some embodiments, the cross-linker is active during the heating step. In some embodiments, the cross-linker is active while adhesive layer 34 is drying. In some embodiments, the cross-linker is a phenolic based cross-linker. In an exemplary embodiment, the cross-linking agent comprises HRJ-10518 available from SI Group. In some embodiments, the cross-linker is blended in toluene.

In an exemplary embodiment, the pressure-sensitive adhesive formulation includes a pressure-sensitive adhesive and a cross-linker. The pressure-sensitive adhesive formulation may comprise a percentage of a pressure-sensitive adhesive and the remainder of the percentage is a cross-linker. The pressure-sensitive adhesive may be one of several different percentages of the pressure-sensitive adhesive formulation or fall within one of several different ranges. In a set of ranges, the percentage by weight of the pressure-sensitive adhesive in the pressure-sensitive adhesive formulation may be one of the following ranges: about 85% to about 99%, about 90% to about 99%, about 93% to about 99%, about 94% to about 99%, about 94% to about 98.5%, about 95% to about 98.5%, about 96% to about 98.5%, and about 97% to about 98.5%. The percentage by weight of the pressure-sensitive adhesive in the pressure-sensitive adhesive formulation may be: about 85%, about 90%, about 93%, about 94%, about 95%, about 96%, about 97%, about 98%, about 98.5%, and about 99%. In an example, the pressure-sensitive adhesive is about 95% by weight of the pressure-sensitive adhesive formulation. In another example, the pressure-sensitive adhesive is about 95.2% by weight of the pressure-sensitive adhesive formulation.

The cross-linker may be one of several different percentages of the pressure-sensitive adhesive formulation or fall within one of several different ranges. In a first set of ranges, the percentage by weight of the cross-linker in the pressure-sensitive adhesive formulation may be one of the following ranges: about 0.5% to about 15%, about 1% to about 10%, about 1% to about 7%, about 1% to about 6%, about 1.5% to about 6, about 1.5% to about 5%, about 1.5% to about 4%, and about 1.5% to about 3%. In a second set of ranges, the percentage by weight of the cross-linker in the pressure-sensitive adhesive formulation may on of the following ranges: about 0.5% to about 4% and about 1.5% to about 6%. The percentage by weight of the cross-linker in the pressure-sensitive adhesive formulation may be: about 15%, about 10%, about 7%, about 6%, about 5%, about 4%, about 3%, about 2%, about 1.5%, about 1%, and about 0.5%. The percentage by weight of the cross-linker in the pressure-sensitive adhesive formulation may be: up to about 15%, up to about 10%, up to about 7%, up to about 6%, up to about 5%, up to about 4%, up to about 3%, up to about up to 2%, up to about 1.5%, and up to about 1%.

In an example, the cross-linker is about 5% by weight of the pressure-sensitive adhesive formulation and the remainder of the formulation is the pressure-sensitive adhesive. In another example, the cross-linker is about 4.8% by weight of the pressure-sensitive adhesive formulation In an exemplary embodiment, a pressure-sensitive adhesive formulation comprises Aroset s488 available from Ashland and HRJ-10518 available from SI Group. In another exemplary embodiment, the pressure-sensitive adhesive formulation comprises about 95% by weight Aroset s488 and about 5% by weight HRJ-10518. In another exemplary embodiment, the pressure-sensitive adhesive formulation comprises about 95.2% Aroset s488 and about 4.8% by weight HRJ-10518.

In another exemplary embodiment, pressure-sensitive adhesive layer 34 comprises a pressure-sensitive adhesive formulation including a first pressure-sensitive adhesive, a second pressure-sensitive adhesive, and a cross-linker. The first pressure-sensitive adhesive may be one of several different percentages of the pressure-sensitive adhesive formulation or fall within one of several different ranges. In a set of ranges, the percentage by weight of the first pressure-sensitive adhesive in the pressure-sensitive adhesive formulation may be one of the following ranges: about 50% to about 90%, about 50% to about 85%, about 50% to about 80%, about 55% to about 80%, about 60% to about 80%, about 60% to about 75%, and about 65% to about 70%. The percentage by weight of the first pressure-sensitive adhesive in the pressure-sensitive adhesive formulation may be: about 50%, about 55%, about 60%, about 65%, about 66%, about 67%, about 68%, about 69%, about 70%, about 71%, about 72%, about 73%, about 75%, about 80%, about 85%, and about 90%.

The second pressure-sensitive adhesive may be one of several different percentages of the pressure-sensitive adhesive formulation or fall within one of several different ranges. In a first set of ranges, the percentage by weight of the second pressure-sensitive adhesive in the pressure-sensitive adhesive formulation may be one of the following ranges: about 10% to about 50%, about 15% to about 50%, about 15% to about 45%, about 15% to about 40%, about 20% to about 40%, about 20% to about 35%, about 25% to about 35%, and about 25% to about 30%. In a second set of ranges, the percentage by weight of the second pressure-sensitive adhesive in the pressure-sensitive adhesive formulation may be about 16% to about 40%.

In an embodiment, the pressure-sensitive adhesive formulation comprises about 60% to about 80% of a first pressure-sensitive adhesive, about 15% to about 40% of a second pressure sensitive adhesive, and about 0.5% of a cross-linker. In an exemplary embodiment, a pressure-sensitive adhesive formulation comprises Aroset s488 available from Ashland and s8764 available from Avery-Dennison as the first pressure-sensitive adhesive, s8764 available from Avery-Dennison as a second pressure-sensitive adhesive, and HRJ-10518 available from SI Group as a cross-linker. In yet another exemplary embodiment, the pressure-sensitive adhesive formulation comprises about 70% by weight of Aroset s488 and about 28% by weight of s8764 available from Avery-Dennison, and about 2% by weight of HRJ-10518 available from SI Group.

Backing layer 36 mates with pressure-sensitive adhesive layer 34 to provide structural strength to closure strip 16. In an embodiment, backing layer 36 includes a tie layer that extends between and interconnects backing layer 36 with pressure-sensitive adhesive layer 34. In an illustrative embodiment, tie layer comprises a urethane.

In an exemplary embodiment, backing layer 36 comprises an irradiated polyethylene. In another embodiment, backing layer 36 comprises a fiberglass. In yet another embodiment, backing layer 36 comprises Glass Cloth style 1131, Finish Greige with a plain weave type, available from JPS.

Release liner 19 mates with pressures-sensitive adhesive layer 34 and forms closure patch 21. In an embodiment, release liner 19 comprises plastic. In another embodiment, release liner 19 comprises paper. In yet another embodiment, release liner 19 is silicon coated.

Closure strip 16 provides minimized installation time to mount wraparound sheet 14 on tube 12 to form heat-shrink sleeve 17. The use of or need for specialized equipment, other than torch 80 for heating heat-shrink sleeve 17, may also be minimized. Furthermore, mounting closure strip 16 to wraparound sheet 14 without heat further expedites the formation of heat-shrink sleeve 17 to reduce the amount of time for forming conduit 10.

Figure 10:
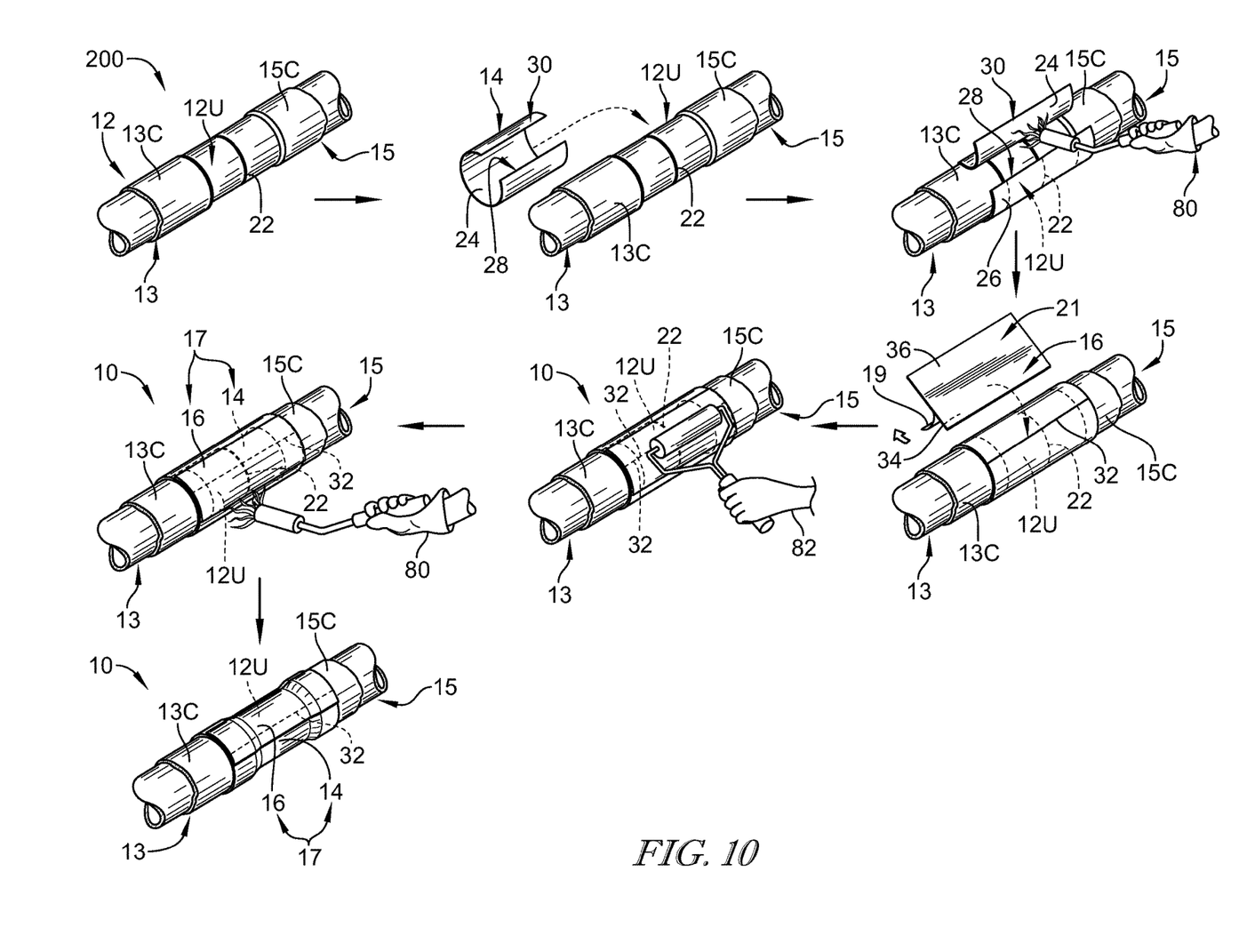

An illustrative process 200 for forming a conduit 10 is shown in FIG. 10. Process 200 includes a step of providing tube 12 including first pipe 13 and second pipe 15 joined at pipe joint 22. Each of first pipe 13 and second pipe 15 include exterior pipe coatings 13C, 15C. Tube 12 further includes uncoated region 12U located between first exterior pipe coating 13C and second exterior pipe coating 15C.

Process 200 further includes a step of providing wraparound sheet 14 as shown in FIG. 10. Wrap-around sheet 14 includes exterior layer 26 and interior layer 24. In an example, interior layer 24 is also called interior heat-activated heat shrink layer 24. In example, exterior layer 26 is also called exterior heat-activated heat shrink layer 26. Wraparound sheet 14 further includes first edge 28 and second edge 30 located spaced-apart from first edge 28.

Process 200 further includes a step of wrapping circumferentially wraparound sheet 14 around pipe joint 22 and uncoated region 12U causing first edge 28 to be located radially between heat-activated adhesive layer 24 of second edge 30 and pipe joint 22 as shown in FIG. 10. Process 200 further includes a step of adhering interior layer 24 of second edge 30 as shown in FIG. 10 to bond interior layer 24 of second edge 30 with exterior layer 26 of first edge 28 to form sheet seam 32.

Process 200 further includes a step of providing closure patch 21 and removing release liner 19 to form closure strip 16. Process 200 further includes locating closure strip 16 on sheet seam 32 as shown in FIG. 10.

Process 200 further includes a step of applying pressure with a roller 82 to mate pressure-sensitive adhesive layer 34 of closure strip 16 to wraparound sheet 14 without heat as shown in FIG. 10 to form heat-shrink sleeve 17.

Process 200 further includes heating heat-shrink sleeve 17 with torch 80 to cause heat-shrink sleeve to shrink radially as shown in FIG. 10. Shrinking heat-shrink sleeve 17 causes interior layer 24 of wraparound sheet 14 to mate with uncoated region 12U of tube 12. Mating heat-shrink sleeve 17 with uncoated region 12U protects uncoated region 12U from corrosion. Shrunk, or recovered, heat-shrink sleeve 17 cooperates with first pipe coating 13C and second exterior pipe coating 15C to form a continuous corrosion protection system for conduit 10.

Pressure-sensitive adhesive layer 34 extends between and interconnects backing layer 36 with exterior layer 26 of wraparound sheet 14, as shown in FIGS. 5, 6, and 8. Pressure-sensitive adhesive layer 34 is configured to provide means for coupling closure strip 16 to wraparound sheet 14 without heating so that movement of first edge 28 of wraparound sheet 14 relative to second edge 30 of wraparound sheet 14 during heat shrinking of heat-shrink sleeve 17 is minimized. Pressure-sensitive adhesive layer 34 comprises a pressure-sensitive adhesive that couples closure strip 16 to wraparound sheet 14 without heat.

EXAMPLES

Example 1

Pressure-Sensitive Adhesive Formulation 1

Pressure-sensitive adhesive formulation 1 is formed by blending Aroset s488 and HRJ-10518 as described in Table 1. Aroset s488 is provided in a solvent blend comprising
about 52% Ethyl Acetate,
about 41% Toluene, and
about 7% Isopropanol.

TABLE 1

Pressure-sensitive adhesive formulation 1

| Component | Product ID | Dry Weight (%) | Wet Weight (%) |
|---|---|---|---|
| Pressure-sensitive adhesive | Aroset s488 | 95.24% | 95.24% |
| Cross-linker | HRJ-10518 in Toluene (1 to 1) | 4.76% | 4.76% |

Example 2

Pressure-Sensitive Adhesive Formulation 2

Pressure-sensitive adhesive formulation 2 is formed by blending Aroset s488, HRJ-10518, and s8764 according to Table 2. Aroset s488 is provided in a solvent blend as described in Example 1. s8764 is provided in a solvent blend comprising
about 35% Ethyl Acetate,
about 53% Toluene,
about 12% Isopropanol

TABLE 2

Pressure-sensitive adhesive formulation 2

| Component | Product ID | Dry Weight (%) | Wet Weight (%) |
|---|---|---|---|
| First pressure-sensitive adhesive | Aroset s488 | 69.6% | 70.0% |
| Cross-linker | HRJ-10518 in Toluene (1 to 1) | 2.0% | 2.0% |
| Second pressure-sensitive adhesive | Avery Dennison s8764 | 28.4% | 28.0% |

Pressure-Sensitive Adhesive Formulation 3

Pressure-sensitive adhesive formulation 3 is formed by blending Aroset 1551a according to Table 3. Aroset 1551a is provided in a solvent blend comprising
about 60% Ethyl Acetate,
about 20% Heptane,
about 17% Toluene, and
about 3% Isopropanol

TABLE 3

Pressure-sensitive adhesive formulation 3

| Component | Product ID | Dry Weight (%) | Wet Weight (%) |
|---|---|---|---|
| Pressure-sensitive adhesive | Aroset 1551a | 100% | 100% |

Example 4

Closure Patch Formation

A closure patch 21 was constructed with the following layers:

backing layer 36 comprising Glass Cloth style 1131, Finish Greige with a plain weave type, available from JPS;

a tie layer comprising a urethane available from Worthen Industries; and pressure-sensitive adhesive layer 34 prepared as described in Example 1.

The thicknesses and weight percentage of each layer is shown in Table 4:

TABLE 4

Measurements of an exemplary closure strip:

| Layer | Thickness (mil) | Weight (lbs/ream) | Weight (%) |
|---|---|---|---|
| Backing layer | 4.8 | 74 | 45.40 |
| Tie layer | 0.15 | 9 | 5.52 |
| Pressure-sensitive adhesive layer | 5 | 80 | 49.08 |

The invention claimed is:

1. A conduit, comprising:

a tube including a first pipe coupled to a second pipe at a pipe joint, a wraparound sheet formed to include a tube-receiving passageway to locate the tube therethrough, and a sheet seam extending co-axial with the tube-receiving passageway and formed by a first edge of the wraparound sheet being spaced-apart radially from the tube-receiving passageway and overlapping a second edge of the wraparound sheet to locate the second edge between the first edge and the tube-receiving passageway, and a closure strip including a backing layer and a pressure-sensitive adhesive layer coupled to the wraparound sheet to locate the sheet seam between the closure strip and the tube to form a heat-shrink sleeve, the pressure-sensitive adhesive layer being configured to couple the closure strip to the wraparound sheet without heat, wherein the pressure-sensitive adhesive layer comprises a pressure-sensitive adhesive formulation comprising a first pressure-sensitive adhesive and a second pressure-sensitive adhesive.

2. The conduit of claim 1, wherein the first pressure-sensitive adhesive is about 50% to about 85% by weight of the pressure-sensitive adhesive formulation.

3. The conduit of claim 2, wherein the first pressure-sensitive adhesive is about 60% to about 80% by weight of the pressure-sensitive adhesive formulation.

4. The conduit of claim 1, wherein the second pressure-sensitive adhesive is about 10% to about 50% by weight of the pressure-sensitive adhesive formulation.

5. The conduit of claim 4, wherein the second pressure-sensitive adhesive layer is about 10% to about 30% by weight of the pressure-sensitive adhesive formulation.

6. The conduit of claim 4, wherein the first pressure-sensitive adhesive is about 50% to about 85% by weight of the pressure-sensitive adhesive formulation.

7. The conduit of claim 4, wherein the pressure-sensitive adhesive formulation further comprises a cross-linker.

8. The conduit of claim 7, wherein the cross-linker is up to about 2% by weight of the pressure-sensitive adhesive formulation.

9. The conduit of claim 1, wherein the pressure-sensitive adhesive is about 70% by weight of the pressure-sensitive adhesive formulation, the second pressure-sensitive adhesive is about 28% by weight pressure-sensitive adhesive formulation.

10. The conduit of claim 9, further comprising a cross-linker.

11. The conduit of claim 9, wherein the cross-linker is up to about 2% by weight of the pressure-sensitive adhesive formulation.

12. The conduit of claim 9, wherein the cross-linker is about 2% by weight of the pressure-sensitive adhesive formulation.

13. A conduit, comprising:
a tube including a first pipe coupled to a second pipe at a pipe joint,
a wraparound sheet formed to include a tube-receiving passageway to locate the tube therethrough, and a sheet seam extending co-axial with the tube-receiving passageway and formed by a first edge of the wraparound sheet being spaced-apart radially from the tube-receiving passageway and overlapping a second edge of the wraparound sheet to locate the second edge between the first edge and the tube-receiving passageway, and
a closure strip including a backing layer and a pressure-sensitive adhesive layer coupled to the wraparound sheet to locate the sheet seam between the closure strip and the tube to form a heat-shrink sleeve, the pressure-sensitive adhesive layer being configured to couple the closure strip to the wraparound sheet without heat, wherein the pressure-sensitive adhesive layer comprises a pressure-sensitive adhesive formulation including an acrylic pressure-sensitive adhesive and a cross-linker.

14. The conduit of claim 13, wherein the acrylic pressure-sensitive adhesive is about 90% to about 99% by weight of the pressure-sensitive adhesive formulation.

15. The conduit of claim 14, wherein the cross-linker is up to about 10% by weight of the pressure-sensitive adhesive formulation.

16. The conduit of claim 15, wherein the pressure-sensitive adhesive formulation comprises about 95% by weight an acrylic pressure-sensitive adhesive and about 5% by weight of a cross-linker.

17. A conduit comprising
a tube including a first pipe coupled to a second pipe at a pipe joint, and
a wraparound sheet formed to include a tube-receiving passageway, a first-end aperture opening into the tube-receiving passageway at a first end of the wraparound sheet, a second-end aperture opening into the tube-receiving passageway at an opposite second end of the Wraparound sheet, the tube-receiving passageway, the first-end aperture, and the second-end aperture cooperating to locate the tube therethrough, and a sheet seam extending co-axial with the tube-receiving passageway from the first-end aperture to the second-end aperture and formed by a first edge of the wraparound sheet being spaced-apart radially from the tube-receiving passageway and overlapping a second edge of the wraparound sheet to locate the second edge between the first edge and the tube-receiving passageway, a closure strip including a backing layer and a pressure-sensitive adhesive layer coupled to the wraparound sheet to locate the sheet seam between the closure strip and the tube to form a heat-shrink sleeve, the pressure-sensitive adhesive layer being configured to provide means for coupling the closure strip to the wraparound sheet without heating so that movement of the first edge of the wraparound sheet relative to the second edge of the wraparound sheet during heat shrinking of the heat-shrink sleeve is minimized, wherein the pressure-sensitive adhesive layer comprises a pressure-sensitive adhesive formulation comprising a first pressure-sensitive adhesive and a second pressure-sensitive adhesive.

18. A conduit comprising
a tube including a first pipe coupled to a second pipe at a pipe joint, and
a wraparound sheet formed to include a tube-receiving passageway, a first-end aperture opening into the tube-receiving passageway at a first end of the wraparound sheet, a second-end aperture opening into the tube-receiving passageway at an opposite second end of the Wraparound sheet, the tube-receiving passageway, the first-end aperture, and the second-end aperture cooperating to locate the tube therethrough, and a sheet seam extending co-axial with the tube-receiving passageway from the first-end aperture to the second-end aperture and formed by a first edge of the wraparound sheet being spaced-apart radially from the tube-receiving passageway and overlapping a second edge of the wraparound sheet to locate the second edge between the first edge and the tube-receiving passageway, a closure strip including a backing layer and a pressure-sensitive adhesive layer coupled to the wraparound sheet to locate the sheet seam between the closure strip and the tube to form a heat-shrink sleeve, the pressure-sensitive adhesive layer being configured to provide means for coupling the closure strip to the wraparound sheet without heating so that movement of the first edge of the wraparound sheet relative to the second edge of the wraparound sheet during heat shrinking of the heat-shrink sleeve is minimized, wherein the pressure-sensitive adhesive layer comprises a pressure-sensitive adhesive formulation including an acrylic pressure-sensitive adhesive and a cross-linker.

* * * * *